(12) United States Patent
Yamaguchi

(10) Patent No.: US 10,354,409 B2
(45) Date of Patent: Jul. 16, 2019

(54) IMAGE PROCESSING DEVICE, IMAGE PROCESSING METHOD, AND NON-TRANSITORY COMPUTER-READABLE RECORDING MEDIUM

(71) Applicant: FUJITSU LIMITED, Kawasaki-shi, Kanagawa (JP)

(72) Inventor: Nobuyasu Yamaguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/657,280

(22) Filed: Jul. 24, 2017

(65) Prior Publication Data
US 2018/0061078 A1 Mar. 1, 2018

(30) Foreign Application Priority Data

Aug. 31, 2016 (JP) .................. 2016-170090

(51) Int. Cl.
G06K 9/00 (2006.01)
G06T 7/73 (2017.01)
G06T 7/11 (2017.01)
G06K 9/46 (2006.01)
G06K 9/62 (2006.01)

(52) U.S. Cl.
CPC .................. *G06T 7/74* (2017.01); *G06K 9/46* (2013.01); *G06T 7/11* (2017.01); *G06K 9/6202* (2013.01); *G06T 2207/10028* (2013.01); *G06T 2207/20021* (2013.01); *G06T 2207/30244* (2013.01)

(58) Field of Classification Search
CPC . G06T 2207/10028; G06T 2207/20021; G06T 2207/30244; G06T 7/11; G06T 7/74; G06K 9/46; G06K 9/6202
See application file for complete search history.

(56) References Cited

U.S. PATENT DOCUMENTS

| 2014/0177965 A1 | 6/2014 | Hamada et al. | |
| 2014/0368645 A1* | 12/2014 | Ahuja | ............... H04N 7/183 348/143 |
| 2016/0196654 A1* | 7/2016 | Aoki | .................... G06T 7/73 382/103 |

FOREIGN PATENT DOCUMENTS

| EP | 3008695 A1 | 4/2016 |
| JP | 2013-141049 | 7/2013 |
| JP | 2014-164483 | 9/2014 |

(Continued)

OTHER PUBLICATIONS

European Office Action dated Jun. 20, 2018 for corresponding European Patent Application No. 17183486.4, 7 pages. *Please note EP-3008695-A1 cited herein, was previously cited in IDS filed on Nov. 11, 2017.*.

(Continued)

*Primary Examiner* — Amara Abdi
(74) *Attorney, Agent, or Firm* — Fujitsu Patent Center

(57) ABSTRACT

An image processing device divides a recognition purpose image into a plurality of areas, selects feature points in the recognition purpose image such that a bias of the number of the feature points included in each of the areas is small registers information on the selected feature points in the recognition purpose image in a memory and estimates a position and an orientation of the camera based on the recognition purpose image registered in the memory and based on a captured image captured by a camera.

12 Claims, 16 Drawing Sheets

(56) References Cited

FOREIGN PATENT DOCUMENTS

WO 2014/200665 A1 12/2014

OTHER PUBLICATIONS

Extended European Search Report dated Oct. 20, 2017 corresponding to European Patent Application No. 17183486.4, 7 pages.

* cited by examiner

FIG.2

| IDENTIFICATION INFORMATION | RECOGNITION PURPOSE IMAGE | FEATURE POINT COORDINATES | FEATURE AMOUNT |
|---|---|---|---|
| 1001 | RECOGNITION PURPOSE IMAGE OF IMAGE IDENTIFICATION INFORMATION "1001" | THREE-DIMENSIONAL COORDINATES OF FEATURE POINTS IN RECOGNITION PURPOSE IMAGE OF IMAGE IDENTIFICATION INFORMATION "1001" | FEATURE AMOUNT OF FEATURE POINTS IN RECOGNITION PURPOSE IMAGE OF IMAGE IDENTIFICATION INFORMATION "1001" |
| 1002 | RECOGNITION PURPOSE IMAGE OF IMAGE IDENTIFICATION INFORMATION "1002" | THREE-DIMENSIONAL COORDINATES OF FEATURE POINTS IN RECOGNITION PURPOSE IMAGE OF IMAGE IDENTIFICATION INFORMATION "1002" | FEATURE AMOUNT OF FEATURE POINTS IN RECOGNITION PURPOSE IMAGE OF IMAGE IDENTIFICATION INFORMATION "1002" |
| 1003 | RECOGNITION PURPOSE IMAGE OF IMAGE IDENTIFICATION INFORMATION "1003" | THREE-DIMENSIONAL COORDINATES OF FEATURE POINTS IN RECOGNITION PURPOSE IMAGE OF IMAGE IDENTIFICATION INFORMATION "1003" | FEATURE AMOUNT OF FEATURE POINTS IN RECOGNITION PURPOSE IMAGE OF IMAGE IDENTIFICATION INFORMATION "1003" |
| 1004 | RECOGNITION PURPOSE IMAGE OF IMAGE IDENTIFICATION INFORMATION "1004" | THREE-DIMENSIONAL COORDINATES OF FEATURE POINTS IN RECOGNITION PURPOSE IMAGE OF IMAGE IDENTIFICATION INFORMATION "1004" | FEATURE AMOUNT OF FEATURE POINTS IN RECOGNITION PURPOSE IMAGE OF IMAGE IDENTIFICATION INFORMATION "1004" |
| ... | ... | ... | ... |

| NUMBER | MAP POINT COORDINATES ||| FEATURE AMOUNT | CLASSIFICATION |
|---|---|---|---|---|---|
| | x COORDINATE | y COORDINATE | z COORDINATE | | |
| 1 | x1 | y1 | 0 | m1 | INTERNAL POINT |
| 2 | x2 | y2 | 0 | m2 | INTERNAL POINT |
| 3 | x3 | y3 | 0 | m3 | INTERNAL POINT |
| 4 | x4 | y4 | z4 | m4 | EXTERNAL POINT |
| 5 | x5 | y5 | z5 | m5 | EXTERNAL POINT |
| 6 | x6 | y6 | z6 | m6 | EXTERNAL POINT |
| . | . | . | . | . | . |
| . | . | . | . | . | . |

143

FIG.6
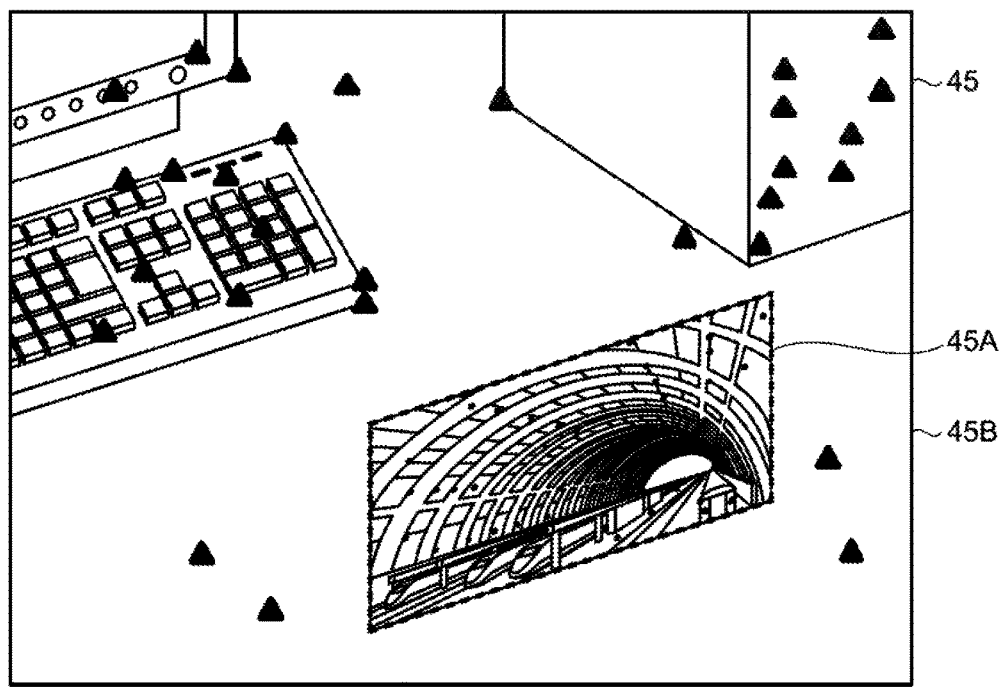
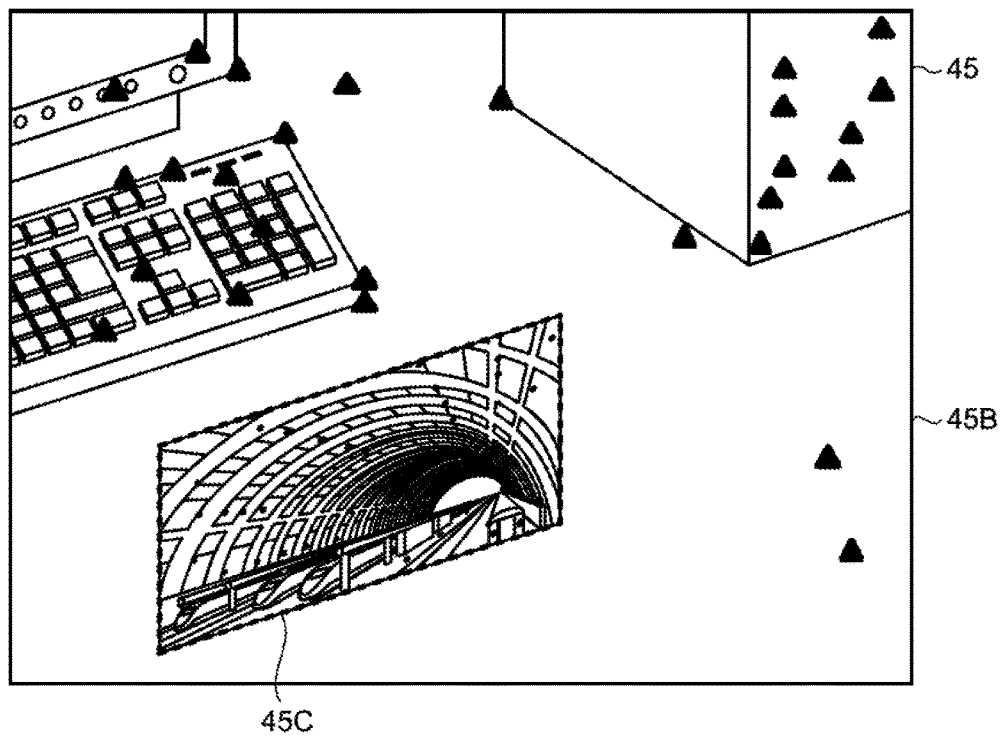

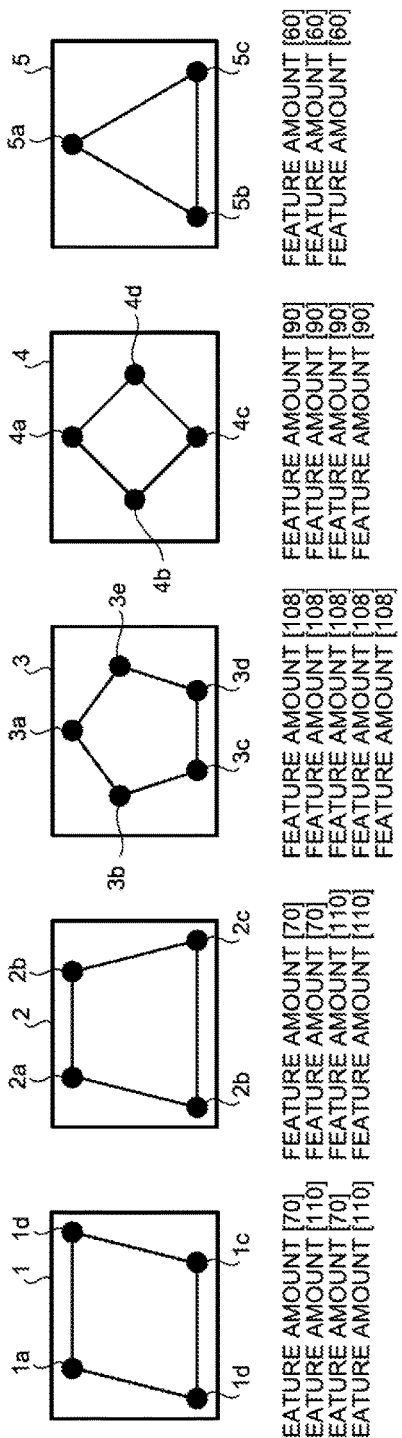
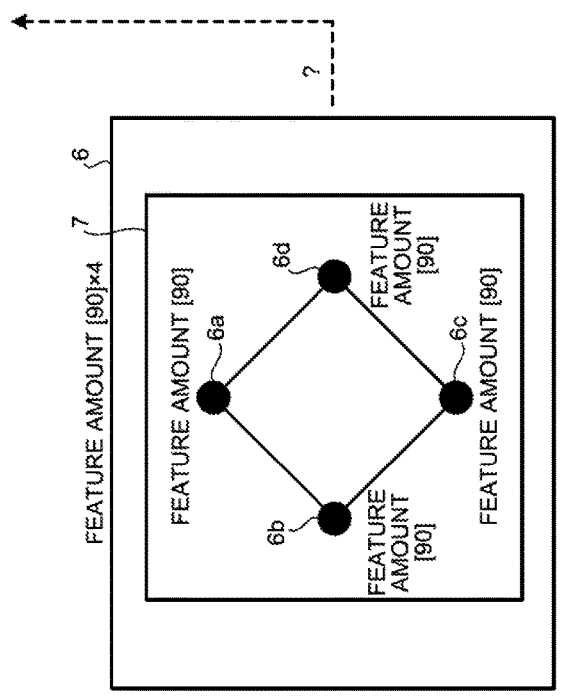
FIG.15

FIG.16
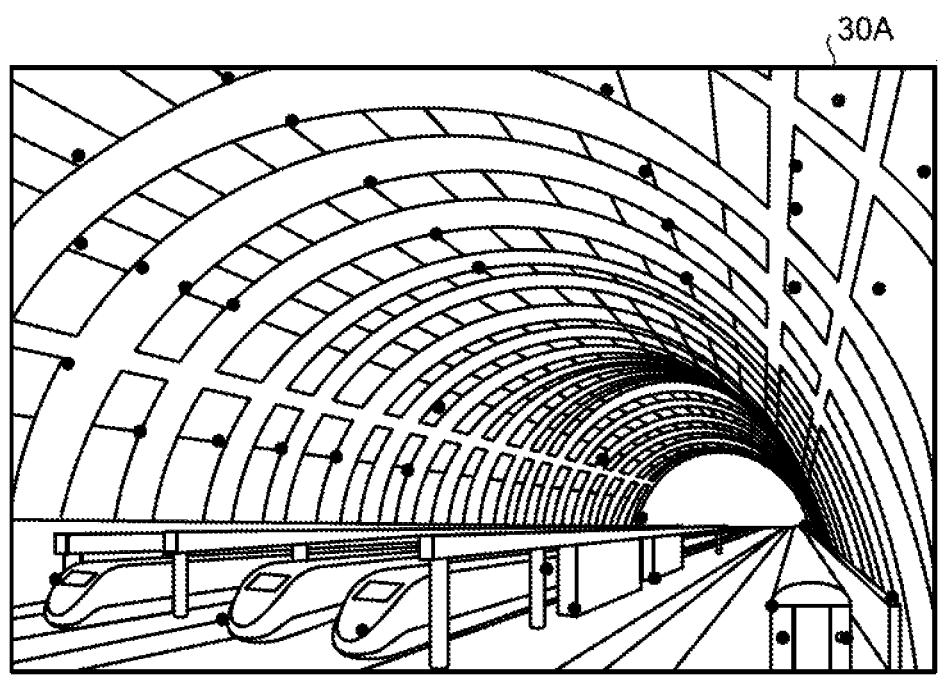
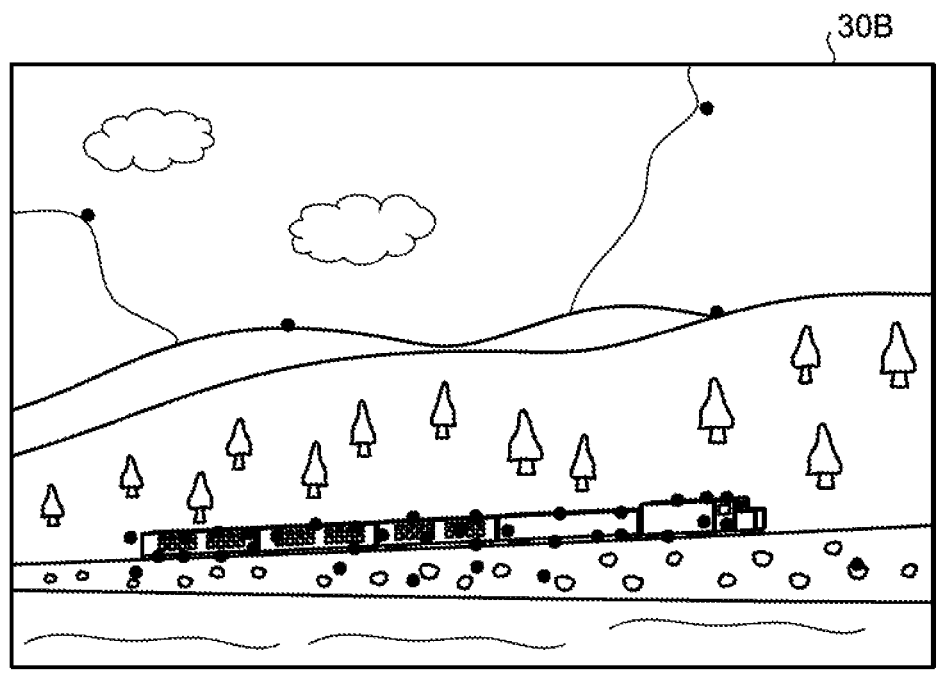

FIG.17
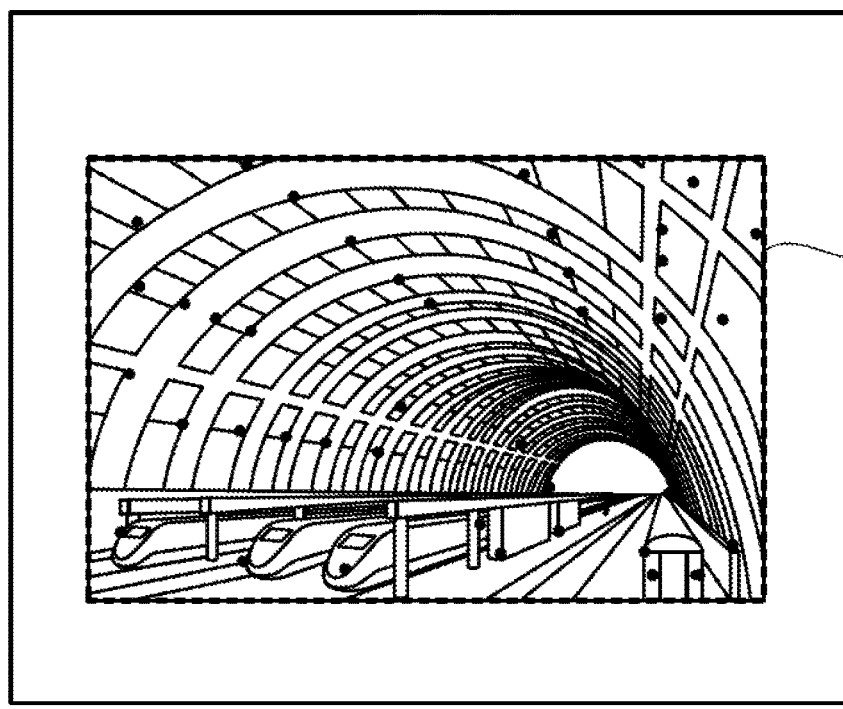
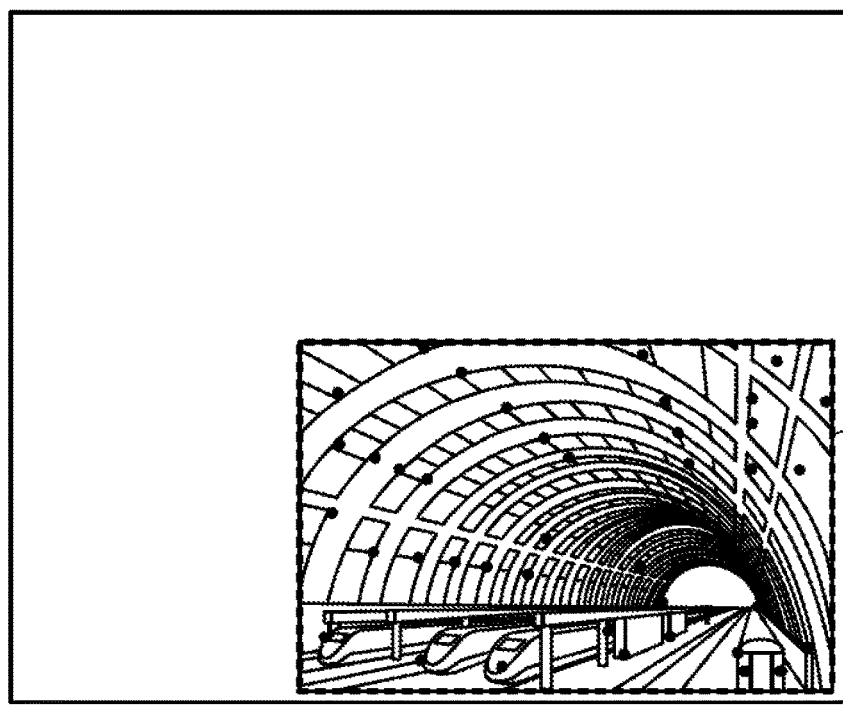

IMAGE PROCESSING DEVICE, IMAGE PROCESSING METHOD, AND NON-TRANSITORY COMPUTER-READABLE RECORDING MEDIUM

CROSS-REFERENCE TO RELATED APPLICATION

This application is based upon and claims the benefit of priority of the prior Japanese Patent Application No. 2016-170090, filed on Aug. 31, 2016, the entire contents of which are incorporated herein by reference.

FIELD

The embodiment discussed herein is directed to an image processing device and the like.

BACKGROUND

There is a technology that obtains the position and the orientation of a camera with respect to a captured image based on the captured image of the camera attached to a personal computer (PC), a mobile terminal, or the like. Furthermore, there is an augmented reality (AR) technology that superimposes, by using the position and the orientation of a camera, additional information, such as computer graphics (CG), or the like, onto a captured image displayed on a screen of a PC, a mobile terminal, or the like and that implements a work support for a user.

FIG. 11 is a schematic diagram illustrating an example of the AR technology. As illustrated in FIG. 11, for example, if a user captures both an image of a marker 11 and a check target 12 by using a camera that is built into a mobile terminal 10, object information 13 with respect to the marker 11 is displayed on a screen 10a of the mobile terminal 10.

As a method of obtaining the position and the orientation of a camera, there is a conventional technology 1 that calculates the position and the orientation of the camera by using, for example, feature points included in a captured image. The conventional technology 1 detects the feature points based on the state in which the variation in shadings in the vicinity of the point of interest is great and the position of the point of interest on the image is uniquely specified due to the variation in shadings. The conventional technology 1 uses a set of three-dimensional coordinates of the previously created feature points. In a description below, the three-dimensional coordinates of the previously created feature points is appropriately referred to as map points and a set of the map points is appropriately referred to as a three-dimensional map. The conventional technology 1 calculates the position and the orientation of the camera by associating the feature points that are present in the captured image at the present time with the projected map points in the captured image.

FIG. 12 is a schematic diagram illustrating the conventional technology 1 that obtains the position and the orientation of a camera. In the example illustrated in FIG. 12, it is assumed that map points $S_1$ to $S_6$ are present. A certain map point $S_1$ is represented by Equation (1) in the world coordinate system. It is assumed that feature points $x_1$ to $x_6$ are present in a captured image 20. A certain feature point $x_i$ is represented by Equation (2) in a camera coordinate system. It is assumed that the map points projected on the captured image 20 are projection points $x_1'$ to $x_6'$. A certain projection point $x_i'$ is represented by Equation (3) in the camera coordinate system.

$$S_i = (x, y, z) \quad (1)$$

$$x_i = (u, v) \quad (2)$$

$$x_i' = (u', v') \quad (3)$$

For example, in the conventional technology 1, the position and the orientation of the camera are obtained by calculating a camera position/orientation matrix RT in which the sum of squares E calculated by Equation (4) becomes the minimum. The process of estimating the position and the orientation of the camera for each of the series of captured images is referred to as "tracking".

$$E = \sum_P |x_P' - x_P|^2 \quad (4)$$

Subsequently, the conventional technology 1 that creates a three-dimensional map will be described. FIG. 13 is a schematic diagram illustrating the conventional technology 1 that creates a three-dimensional map. For example, the conventional technology 1 uses a principle of stereo image capturing. The conventional technology 1 associates the same feature points in two captured images that are obtained from different image capturing positions. The conventional technology 1 creates a three-dimensional map in which the associated points are used as map points based on the positional relationship between the multiple associated points that are present in each of the captured images.

In the example illustrated in FIG. 13, it is assumed that the map point to be restored is represented by $S_i$ and the intersection point of the line connecting an initial image capturing position Ca of the camera to the map point $S_i$ and a first captured image 20a is represented by a feature point $x_{ai}$. It is assumed that the intersection point of the line connecting a second image capturing position Cb of the camera to the map point $S_i$ and a second captured image 20b is represented by a feature point $x_{bi}$. Then, the associated points are a feature point $x_{ai}$ and a feature point $x_{bi}$. The conventional technology 1 calculates the three-dimensional coordinates of the map point $S_i$ based on the relationship between the feature points $x_{ai}$ and $x_{bi}$ and the map point $S_i$ based on the principle of stereo image capturing.

In general, the position and the image capturing direction of the camera of the first captured image is used for the origin of the three-dimensional coordinates of the three-dimensional map. FIG. 14 is a schematic diagram illustrating an example of a definition of the image capturing direction of the camera. As illustrated in FIG. 14, the origin of the three-dimensional coordinates of the three-dimensional map is defined based on, for example, the position $(T_x, T_y, T_z)$ and the orientation $(R_x, R_y, R_z)$ of a camera 50.

There is a conventional technology 2 as a technology that similarly uses the feature points included in a captured image and that is similar to the conventional technology 1. FIG. 15 is a schematic diagram illustrating the conventional technology 2. The conventional technology 2 determines whether a previously prepared recognition purpose image is included in a captured image. As a recognition purpose image, an image, such as a photograph, an illustration, an icon, or the like, is used. In the recognition purpose image, information on the coordinate position of a feature point and information on a feature amount of the feature point are associated. The feature amount is a numerical value vector used to distinguish differences between the other feature points and indicates the density distribution of a plurality of pixels in the vicinity of the feature point.

The conventional technology 2 compares the feature amounts of the feature points in the captured image with the feature amounts of the feature points in each of the recognition purpose images and determines that the recognition purpose image in which the match rate of the feature amounts is the highest is included in the captured image. When determining the recognition purpose image included in the captured image, the conventional technology 2 calculates, similarly to the conventional technology 1, the position and the orientation of the camera by using each of the coordinate positions associated with the determined recognition purpose image as a three-dimensional map.

In the example illustrated in FIG. 15, it is assumed that recognition purpose images 1 to 5 are stored in a database. It is assumed that feature points 1a to 1d are included in a recognition purpose image 1 and assumed that the feature amounts of the respective feature points are 70, 110, 70, and 110. It is assumed that feature points 2a to 2d are included in a recognition purpose image 2 and assumed that the feature amounts of the respective feature points are 70, 70, 110, and 110. It is assumed that feature points 3a to 3e are included in a recognition purpose image 3 and assumed that the feature amounts of the respective feature points are 108, 108, 108, 108, and 108. It is assumed that feature points 4a to 4d are included in a recognition purpose image 4 and assumed that the feature amounts of the respective feature points are 90, 90, 90, and 90. It is assumed that feature points 5a to 5c are included in a recognition purpose image 5 and assumed that the feature amounts of the respective feature points are 60, 60, and 60.

The conventional technology 2 detects feature points 6a to 6d from a captured image 6 and sets the feature amounts of the respective feature points to 90, 90, 90, and 90. The conventional technology 2 compares the feature amounts of the feature points 6a to 6d in the captured image 6 with the feature amounts of the respective feature points in the recognition purpose images 1 to 5. The conventional technology 2 detects the recognition purpose image 4 that includes the feature amounts that is matched with the feature amounts of the feature points 6a to 6d. The conventional technology 2 determines that the recognition purpose image 4 is included in an area 7 in the captured image 6 and calculates the position and the orientation of the camera by using, as the map points, the coordinate positions associated with the feature points 4a to 4d in the recognition purpose image 4.

Patent Document 1: Japanese Laid-open Patent Publication No. 2013-141049

Patent Document 2: Japanese Laid-open Patent Publication No. 2014-164483

However, with the conventional technology described above, there is a problem in that it is not possible to continuously and stably perform a tracking by using a recognition purpose image.

In general, in a case of calculating the position and the orientation of a camera, in principle, the following relationship is present between the feature points and the accuracy. Namely, as map points are widely distributed in a captured image, the accuracy of calculating the position and the orientation of the camera becomes high. Furthermore, as the number of map points present in a captured image is increased, the accuracy of calculating the position and the orientation becomes high.

There may be a case in which the positional distribution of the detected feature points is biased depending on a recognition purpose image. FIGS. 16 and 17 are schematic diagrams each illustrating a problem of the conventional technology. In FIG. 16, in a recognition purpose image 30A, the distribution of the feature points is uniform; however, in a recognition purpose image 30B, the distribution of the feature points is biased. By using the recognition purpose images 30A and 30B, regarding the process of determining the recognition purpose image included in the captured image, the determination accuracy is not decreased regardless of whether the distribution is uniform. However, if the recognition purpose image 30B is included in the captured image and a tracking is attempted by using the recognition purpose image 30B, the map points are not widely distributed in the recognition image and thus the calculation accuracy of the position and the orientation of the camera is decreased.

In order to solve the problem described above, it is conceivable to alleviate a detection condition of the feature points and simply increase the feature points in the recognition purpose image. However, if the number of feature points is simply increased, a new problem, such as an increase in processing time at the time of tracking, or the like, occurs.

In the example illustrated in FIG. 17, the types of the recognition purpose images that are present in the captured images are the same; however, the areas in each of which the recognition purpose image is detected are different. If a recognition purpose image is present in a central area 35A of the captured image, the distribution of the map points is uniform and thus the calculation accuracy of the position and the orientation of the camera is not decreased. However, if the recognition purpose image is present in an area 35B that is the edge of the captured image, the map points are biased in terms of the entire captured image and thus the calculation accuracy of the position and the orientation of the camera is decreased.

SUMMARY

According to an aspect of an embodiment, an image processing device includes a memory; and a processor coupled to the memory, wherein the processor executes a process including: dividing a recognition purpose image into a plurality of areas; selecting feature points in the recognition purpose image such that a bias of the number of the feature points included in each of the areas is small; registering information on the selected feature points in the recognition purpose image in the memory; and estimating a position and an orientation of the camera based on the recognition purpose image registered in the memory and based on a captured image captured by a camera.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a schematic diagram illustrating an example of the data structure of a recognition purpose image table;

FIG. 3 is a schematic diagram illustrating an example of the data structure of feature point map information;

FIG. 6 is a schematic diagram illustrating an update process performed on the feature point map information;

FIG. 15 is a schematic diagram illustrating a conventional technology 2;

FIG. 16 is a schematic diagram (1) illustrating a problem of the conventional technology; and FIG. 17 is a schematic diagram (2) illustrating a problem of the conventional technology.

DESCRIPTION OF EMBODIMENTS

Preferred embodiments of the present invention will be explained with reference to accompanying drawings. Furthermore, the present invention is not limited to the embodiments.

Figure 1:
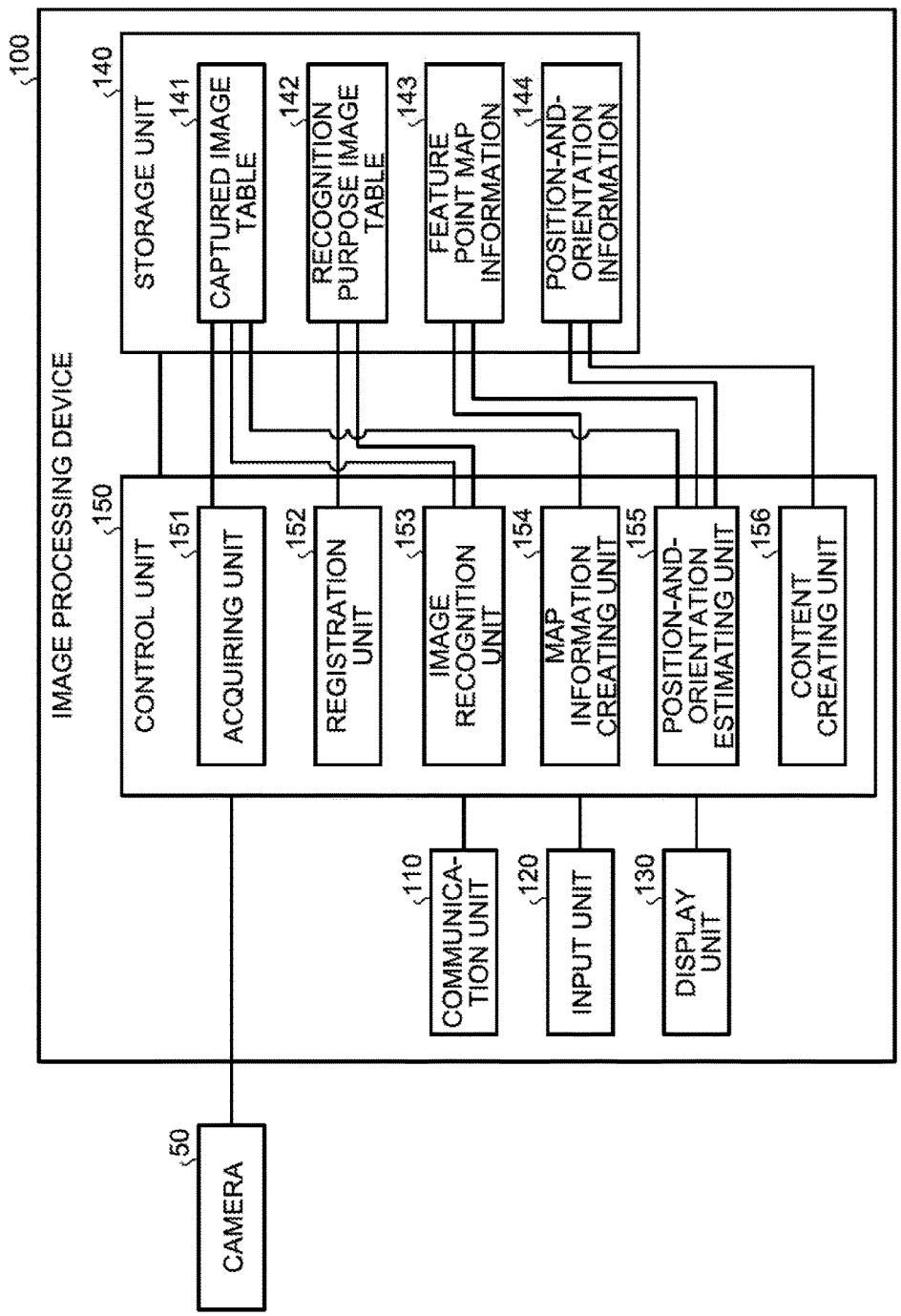
FIG. 1 is a functional block diagram illustrating the configuration of an image processing device according to an embodiment.

FIG. 1 is a functional block diagram illustrating the configuration of an image processing device according to an embodiment. As illustrated in FIG. 1, an image processing device 100 is connected to the camera 50. The image processing device 100 includes a communication unit 110, an input unit 120, a display unit 130, a storage unit 140, and a control unit 150.

The camera 50 is a device that captures an image present in an image capturing range and that outputs information on the captured image to the image processing device 100. The camera 50 may also directly be connected to the image processing device 100 in a wired manner or may also be connected to the image processing device 100 via a network. In a description below, the information on the image captured by the camera 50 is referred to as a captured image data.

The communication unit 110 is a processing unit that is connected to an external device (not illustrated) or the like via the network and that performs data communication with the external device. The communication unit 110 corresponds to a communication device, such as a network interface card (NIC), or the like.

The input unit 120 is an input device that is used to input various kinds of information to the image processing device 100. The input unit 120 corresponds to a keyboard, a mouse, a touch panel, or the like.

The display unit 130 is a display device that displays the information output from the control unit 150. The display unit 130 corresponds to a liquid crystal display, a touch panel, or the like.

The storage unit 140 includes a captured image table 141, a recognition purpose image table 142, a feature point map information 143, and a position-and-orientation information 144. The storage unit 140 corresponds to a semiconductor memory device, such as a random access memory (RAM), a read only memory (ROM), a flash memory, or the like, or a storage device, such as a hard disk drive (HDD), or the like.

The captured image table 141 is a table that stores therein captured image data on the images captured by the camera 50.

The recognition purpose image table 142 is a table that stores therein various kinds of information related to the recognition purpose image data. The recognition purpose image is an image used for a recognition process, which will be described later, and corresponds to a photograph, an illustration, an icon, or the like.

FIG. 2 is a schematic diagram illustrating an example of the data structure of a recognition purpose image table. As illustrated in FIG. 2, the recognition purpose image table 142 associates the identification information, the recognition purpose image, the feature point coordinates, and the feature amount. The identification information is information for uniquely identifying the recognition purpose image. The recognition purpose image is data on a recognition purpose image. The feature point coordinates are the three-dimensional coordinates of each of the feature points included in the recognition purpose image. The feature amount indicates a feature amount of each of the feature points. For example, the feature amount represents the shading distribution of a plurality of pixels in the vicinity of the feature points.

In the recognition purpose image table 142, a combination of the identification information and a recognition purpose image is previously stored in the recognition purpose image table 142. The information on the feature points coordinates and the feature amounts associated with the recognition purpose image data is set by a registration unit 152, which will be described later.

The feature point map information 143 holds the information related to the map point that is used to estimate the position and the orientation of the camera 50. FIG. 3 is a schematic diagram illustrating an example of the data structure of feature point map information. As illustrated in FIG. 3, the feature point map information 143 associates the number, the map point coordinates, the feature amount, and the classification. The number is the number for uniquely identifying the map point. The map point coordinates are the three-dimensional coordinates of the map point and includes the x coordinate, the y coordinate, and the z coordinate. The feature amount indicates the feature amount of the map point. For example, the feature amount represents the shading distribution of the plurality of the pixels in the vicinity of the feature points associated with the map points. The classification is information for identifying whether the subject map point is associated with the feature point inside the recognition purpose image or is associated with the feature point outside the recognition purpose image external. If the map point is associated with the feature point inside the recognition purpose image, the classification is represented by an "internal point". If the map point is associated with the feature point outside the recognition purpose image, the classification is represented by an "external point".

The position-and-orientation information 144 is information on the position and the orientation of the camera 50 at present. For example, the position-and-orientation information 144 is associated with the translation matrix T and the rotation matrix R with respect to the origin of the world coordinate system. The position-and-orientation information is updated by a position-and-orientation estimating unit 155, which will be described later.

The control unit 150 includes an acquiring unit 151, the registration unit 152, an image recognition unit 153, a map information creating unit 154, the position-and-orientation estimating unit 155, and a content creating unit 156. The control unit 150 can be implemented by a central processing unit (CPU), a micro processing unit (MPU), or the like. Furthermore, the control unit 150 can also be implemented by hard wired logic, such as an application specific integrated circuit (ASIC), a field programmable gate array (FPGA), or the like.

The acquiring unit 151 is a processing unit that acquires captured image data from the camera 50. The acquiring unit 151 registers the acquired captured image data in the captured image table 141.

The registration unit 152 divides the recognition purpose image data into a plurality of areas and selects the feature points of the recognition purpose image data such that the number of feature points included in each of the areas is not biased. The registration unit 152 registers the feature point coordinates and the feature amounts of the selected feature points in the recognition purpose image table 142 by associating both the feature point coordinates and the feature amounts with the recognition purpose image data.

Here, the maximum number of feature points that are used in the recognition purpose image data is determined in order to prevent an increase in processing time. In the embodiment, as an example, the maximum number of feature points is set to "n". In the conventional technology, regarding the feature points detected from all of the pieces of the recognition purpose image data, the feature points having a strong characteristic are selected with priority. As a pixel that is in the vicinity of the feature point and that has a larger shading difference, the feature point has a strong characteristic. Consequently, in the conventional technology, there may be a case in which the feature points are concentrated on a specific area in an image depending on the content of the recognition purpose image data.

Figure 4:
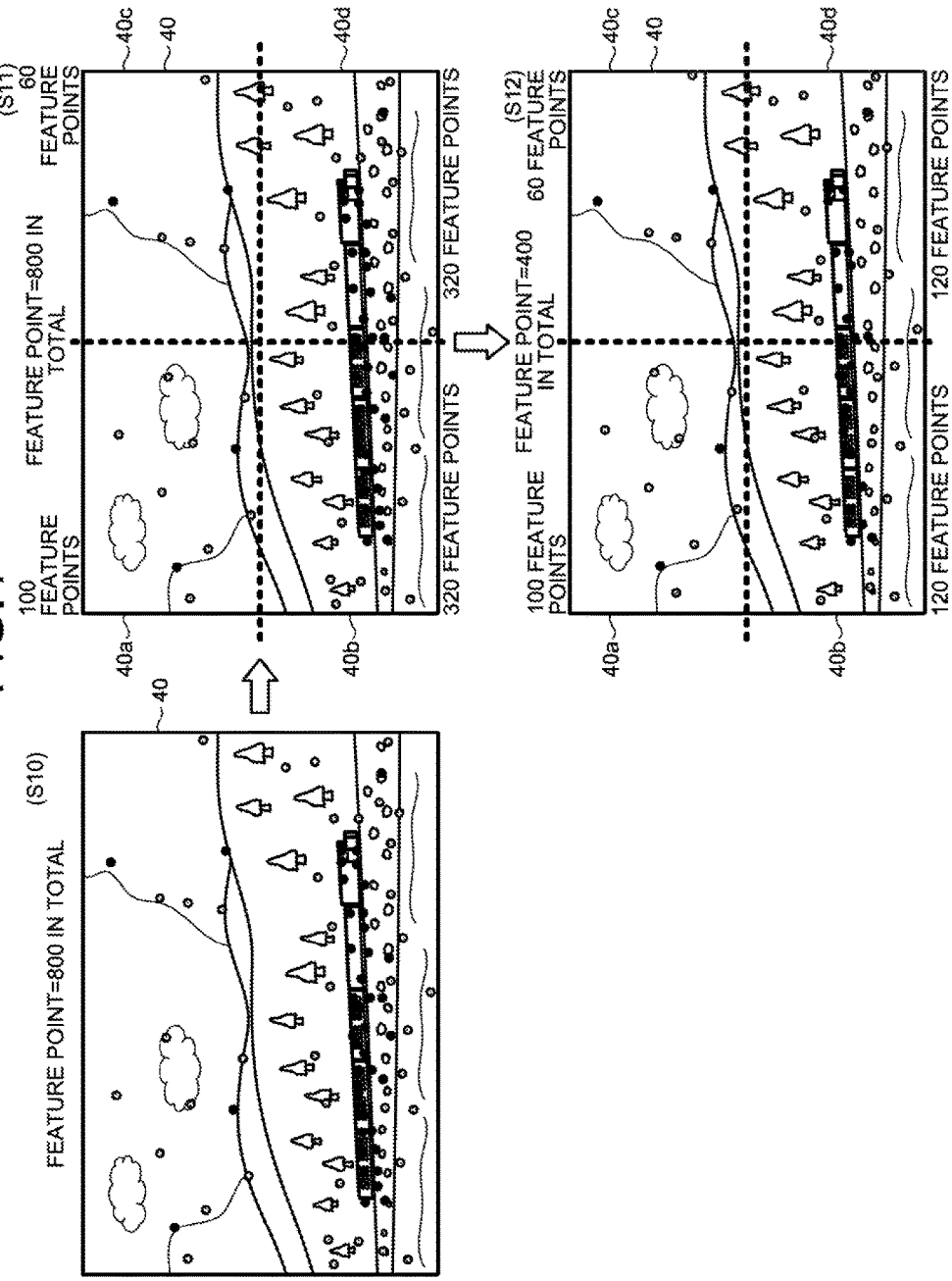
FIG. 4 is a schematic diagram illustrating a process performed by a registration unit.

The registration unit 152 sequentially performs a first to third processes described below in order to prevent the feature points from being concentrated in a specific area in the recognition purpose image data. FIG. 4 is a schematic diagram illustrating a process performed by a registration unit.

The first process will be described. The registration unit 152 extracts "m" feature points from the recognition purpose image data. Here, it is assumed that m>n. The values of m and n are previously set. In an explanation illustrated in FIG. 4, it is assumed that n=400 and m=800. As indicated by Step S10 illustrated in FIG. 4, the registration unit 152 detects 800 feature points from a recognition purpose image data 40.

The second process will be described. The registration unit 152 checks the distribution of the feature points in the recognition purpose image data. The registration unit 152 divides the recognition purpose image data into "k" areas and counts the number of feature points included in each of the areas. In the example indicated by Step S11 illustrated in FIG. 4, the registration unit 152 divides the recognition purpose image data 40 into four areas of 40a, 40b, 40c, and 40d. The registration unit 152 counts the number of feature points in each of the areas 40a to 40d. For example, it is assumed that the number of feature points in the area 40a is 100, the number of feature points in the area 40b is 320, the number of feature points in the area 40c is 60, and the number of feature points in the area 40d is 320.

The third process will be described. The registration unit 152 selects the feature points in each of the areas such that the number of feature points in the individual areas approaches "n/k". In a case of the occurrence of an area in which the number of feature points is less than "n/k", the registration unit 152 increases the number of feature points included in the other areas such that "n" feature points are selected as a whole.

In the example indicated by Step S12 illustrated in FIG. 4, because the state is n=100 and k=4, the registration unit 152 selects the feature points such that the number of feature points detected from each of the areas 40a to 40d approaches "400/4=100". For example, the registration unit 152 selects "120" feature points from "320" feature points that are included in the area 40b. The registration unit 152 selects "120" feature points from "320" feature points that are included in the area 40d. For example, the registration unit 152 sorts the feature points included in the areas in the order in which the shading difference of the pixel in the vicinity of the feature points is large and selects the top 120 feature points.

Furthermore, regarding the area 40a, the registration unit 152 does not select the feature points because the number of feature points is originally 100. Regarding the area 40c, the registration unit 152 does not select the feature points because only "60" feature points are present. The sum of the number of feature points in the areas 40a to 40d after the selection becomes "400".

The registration unit 152 repeatedly performs the processes described above on each of the pieces of the recognition purpose image data and selects the feature points such that a bias of the number of feature points included in each of the areas becomes small. The registration unit 152 registers the feature point coordinates and the feature amounts of the selected feature points in the recognition purpose image table 142 by associating the feature point coordinates and the feature amounts with the recognition purpose image data. Furthermore, because the recognition purpose image data is assumed to be a plane, the coordinate of the z-axis is zero.

A description will be given here by referring back to FIG. 1. The image recognition unit 153 compares the latest captured image data stored in the captured image table 141 with each of the pieces of the recognition purpose image data stored in the recognition purpose image table 142. The image recognition unit 153 determines, based on the comparison result, the recognition purpose image data included in the captured image data.

For example, as described in FIG. 15, the image recognition unit 153 compares the feature amounts of the feature points in the captured image data with the feature amounts of the feature points in each of the pieces of the recognition purpose image data and determines that the recognition purpose image data in which the matched rate of the feature amounts is the greatest is included in the captured image. Furthermore, if the matched rate is less than a threshold in the recognition purpose image data in which the matched rate of the feature amounts is the greatest, the image recognition unit 153 determines that the recognition purpose image data is not present in the captured image data.

If the image recognition unit 153 determines that the recognition purpose image data is included in the captured image data, this indicates that the recognition performed by the image recognition unit 153 has been successful. If the recognition has been successful, the image recognition unit 153 outputs the captured image data and the information on the recognition purpose image data included in the captured image data to the map information creating unit 154. For example, in the information on the recognition purpose image data, the feature point coordinates in the recognition purpose image data and the area information on the captured image data in which the recognition purpose image data is present are included.

Furthermore, if the recognition has been successful, the image recognition unit 153 outputs both the captured image data and the information on the recognition purpose image data to the position-and-orientation estimating unit 155. The position-and-orientation estimating unit 155 calculates the initial value of the position and the orientation of the camera 50 by using the information acquired from the image recognition unit 153.

The map information creating unit 154 is a processing unit that uses, if the recognition performed by the image recognition unit 153 has been successful, the feature point coordinates in the recognition purpose image data included in the captured image data and that creates the feature point map information 143. A description will be given of a process in which the map information creating unit 154 calculates the initial value of the feature point map information 143 and updates the feature point map information 143.

First, a description will be given of a process in which the map information creating unit 154 calculates the initial value of the feature point map information 143. If the recognition performed by the image recognition unit 153 is successful first time since a tracking has been started, the map information creating unit 154 calculates the initial value of the feature point map information 143. The map information creating unit 154 classifies the area of the captured image data into an internal area and an external area. The internal area is an area in which the recognition purpose image data is present in the area of the captured image data. The external area is an area in which the recognition purpose image data is not present in the area of the captured image data.

Figure 5:
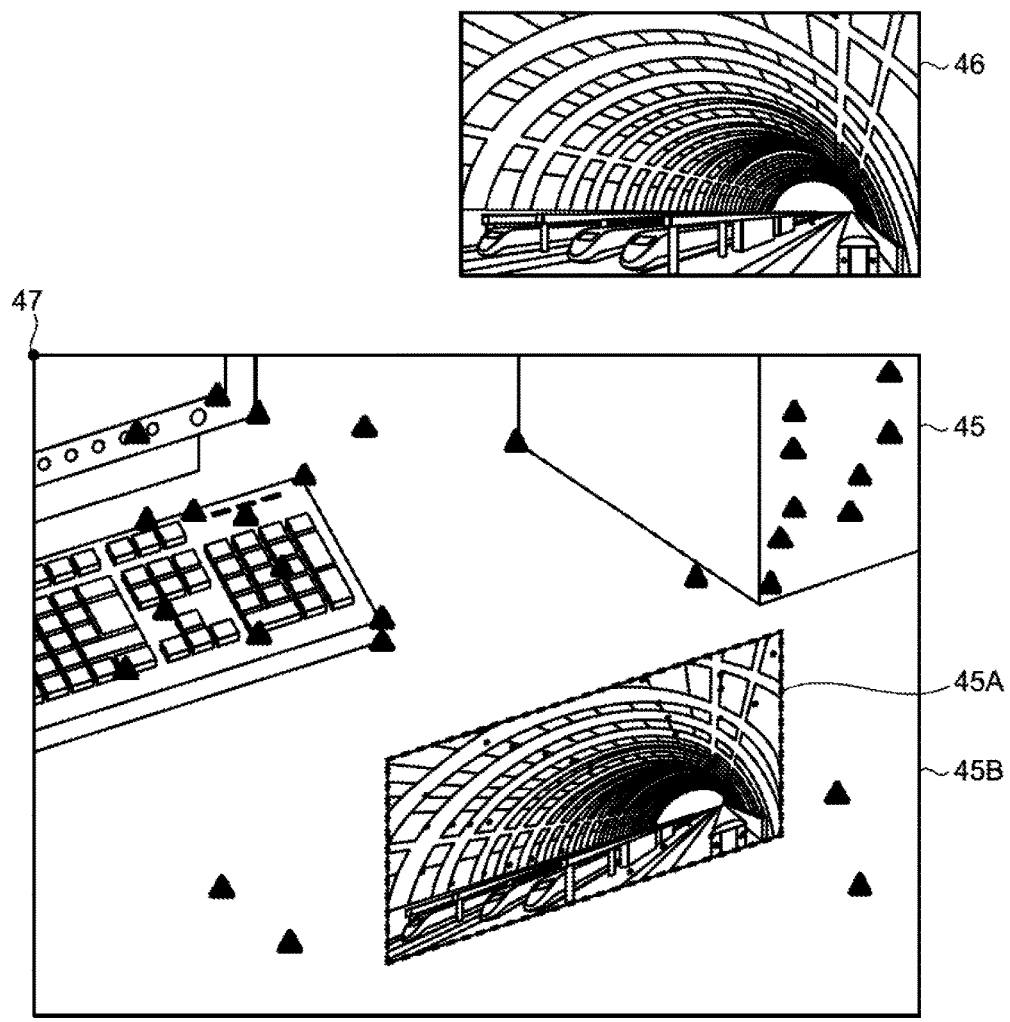
FIG. 5 is a schematic diagram illustrating an internal area and an external area.

FIG. 5 is a schematic diagram illustrating an internal area and an external area. As illustrated in FIG. 5, the map information creating unit 154 classifies the area of a captured image data 45 into an internal area 45A and an external area 45B. In the internal area 45A, recognition purpose image data 46 is present. Each of the circular dots in the internal area 45A indicates the feature point and corresponds to each of the feature points in the recognition purpose image data 46. The triangle symbols in the external area 45B correspond to the feature points.

The map information creating unit 154 specifies the map point coordinates in the internal area 45A by using the feature point coordinates in the recognition purpose image data 46. For example, the map information creating unit 154 specifies the map point coordinates in the internal area 45A by correcting the feature point coordinates in the recognition purpose image data 46 in accordance with the distance from a origin 47 of the captured image data 45 to the internal area 45A. Furthermore, the map information creating unit 154 uses the feature amount of the feature points associated with the map point coordinates in the internal area 45A as the feature amount of the feature points of the subject recognition purpose image data 46.

As another method, instead of using the feature point coordinates in the recognition purpose image data 46 as it is, the map information creating unit 154 may also extract the feature points from the internal area 45A by performing the matching between the feature points included in the recognition purpose image data 46. For example, the map information creating unit 154 performs the matching between the feature points in the internal area 45A and the feature points of the recognition purpose image data 46 and then extracts, from among each of the feature points in the internal area 45A, the feature points that match the feature points in the recognition purpose image data 46 as the feature points in the internal area 45A. Because the map information creating unit 154 performs the following process, it is possible to increase the number of feature points in the captured image data 45 as much as possible.

The map information creating unit 154 registers the map point coordinates included in the internal area 45A and the feature amount thereof in the feature point map information 143. Furthermore, if the map information creating unit 154 registers the map point coordinates in the internal area 45A, the map information creating unit 154 sets the classification of the subject record to "internal point".

Regarding the map point coordinates of the external area 45B, the map information creating unit 154 specifies the map point coordinates by extracting the feature points from the external area 45B. The map information creating unit 154 registers the map point coordinates included in the external area 45B and the feature amount thereof in the feature point map information 143. Furthermore, when the map information creating unit 154 registers the map point coordinates in the external area 45B, the map information creating unit 154 sets the classification of the subject record as an "external point".

Furthermore, when extracting the feature points from the external area 45B, similarly to the case in which the registration unit 152 extracts the feature points described above, the map information creating unit 154 may also divide the external area 45B into a plurality of areas and select the feature points in the external area 45B such that a bias of the number of feature points included in each of the area is small.

Furthermore, because the map point coordinates in the feature point map information 143 is calculated based on the principle of a stereo image, the map point coordinates are not yet decided in the stage of the initial value. However, because the feature points included in the internal area 45A is based on the assumption that the recognition image is a plane, it is guaranteed that the recognition image is also arranged on the same plane even in the three-dimensional coordinate system. Consequently, by using this characteristic, it may also possible to set the value of the z-axis of the map point coordinate to zero and, regarding the values of the x-axis and the y-axis, a temporary coordinate values may also be set by using various kinds of image processing.

Subsequently, a process in which the map information creating unit 154 updates the feature point map information 143 will be described. After the map information creating unit 154 creates the initial value of the feature point map information 143 by using the processes described above, if the recognition performed by the image recognition unit 153 has been successful, the map information creating unit 154 determines whether the recognition purpose image data that is present on the captured image data has been moved. For example, by comparing the map point coordinates in the recognition purpose image data that is present on the current captured image data with the map point coordinates that is associated with the classification of the "internal point" in the feature point map information 143, if the map point coordinates are different, it is determined that the recognition purpose image data has been moved. If the recognition purpose image data has not been moved, the map information creating unit 154 skips the process of updating the feature point map information 143.

If the map information creating unit 154 determines that the recognition purpose image data has been moved, the map information creating unit 154 updates the feature point map information 143. FIG. 6 is a schematic diagram illustrating an update process performed on the feature point map information. In the example illustrated in FIG. 6, the internal area (area of the recognition purpose image data) 45A on the captured image data 45 has been moved to the internal area (area of the recognition purpose image data) 45C. Furthermore, there is no change in the map point coordinates in the external area 45B. In this case, the map information creating unit 154 updates only the map point coordinates that correspond to the classification of the "internal point" from among the map point coordinates in the feature point map information 143. For example, the map information creating unit 154 updates the map point coordinates by moving the map point coordinates by an amount corresponding to the move amount of the recognition purpose image data.

In the example illustrated in FIG. 6, a case in which the recognition purpose image data has been moved and the map point coordinates in the external area are not changed has been described. In contrast, if the feature points in the external area 45B are changed, the map information creating unit 154 again extracts the feature points from the external area 45B and updates, from among the map point coordinates associated with the extracted feature points, the map point coordinates in which the classification is the "external point" from among the map point coordinates in the feature point map information 143. Furthermore, if a bias is present in the distribution of the feature points specified from the captured image data, the map information creating unit 154 returns, as a failure of the process, the information in the feature point map information 143 to the information indicated before the update, acquires new captured image data, and again performs the update process.

The map information creating unit 154 may also determine how the distribution of the feature points is biased. For example, the map information creating unit 154 divides the captured image data into areas. The map information creating unit 154 compares the average value of the number of feature points included in each of the areas with the scores of the feature points in each of the areas and determines that, if there is the area in which a difference value of the score is equal to or greater than a threshold, the distribution of the feature points is biased.

Furthermore, the map information creating unit 154 associates the position of the feature points of the captured image data obtained last time with the feature points of the captured image data obtained this time and calculates, based on the principle of stereo image capturing, the map point coordinates associated with the feature points.

The position-and-orientation estimating unit 155 is a processing unit that estimates the position and the orientation of the camera 50 based on the captured image data and the feature point map information 143. The position-and-orientation estimating unit 155 projects the map points in the feature point map information 143 on the captured image data. The position-and-orientation estimating unit 155 specifies the pair of the feature points and the projection points in the captured image data. As described in Equation (4), the position-and-orientation estimating unit 155 searches for a translation component T and a rotational component R of the camera in which the sum of the difference between the paired feature point $x_i$ and the projection point $x_i'$ of the map point is the minimum and calculates the position and the orientation of the camera. Although a description will be omitted here, the position-and-orientation estimating unit 155 associates the position and the orientation of the camera 50 for each piece of the captured image data that serves as a key frame. The position-and-orientation estimating unit 155 creates the position-and-orientation information 144 on the camera 50 and registers the information in the storage unit 140.

Furthermore, when the recognition performed by the image recognition unit 153 is successful and the area of the recognition purpose image data that is included in the captured image data is specified, the position-and-orientation estimating unit 155 calculates the initial value of the position and the orientation of the camera by using the feature points that are included in the internal area. For example, the pair is specified by using the feature point coordinates in the recognition purpose image data as the map points and by performing the matching between the feature points in the internal area. The position-and-orientation estimating unit 155 calculates the initial value of the position and the orientation of the camera by searching for the translation component T and the rotational component R of the camera in which the sum of the difference between the pair is the minimum.

The content creating unit 156 is a processing unit that arranges, based on the position-and-orientation information 144, the previously prepared content on the captured image data and that displays, on the display unit 130, the captured image data in which the content has been arranged. The content creating unit 156 may also notify an external device connected via a network of the captured image data in which the content has been arranged and display the captured image.

Figure 7:
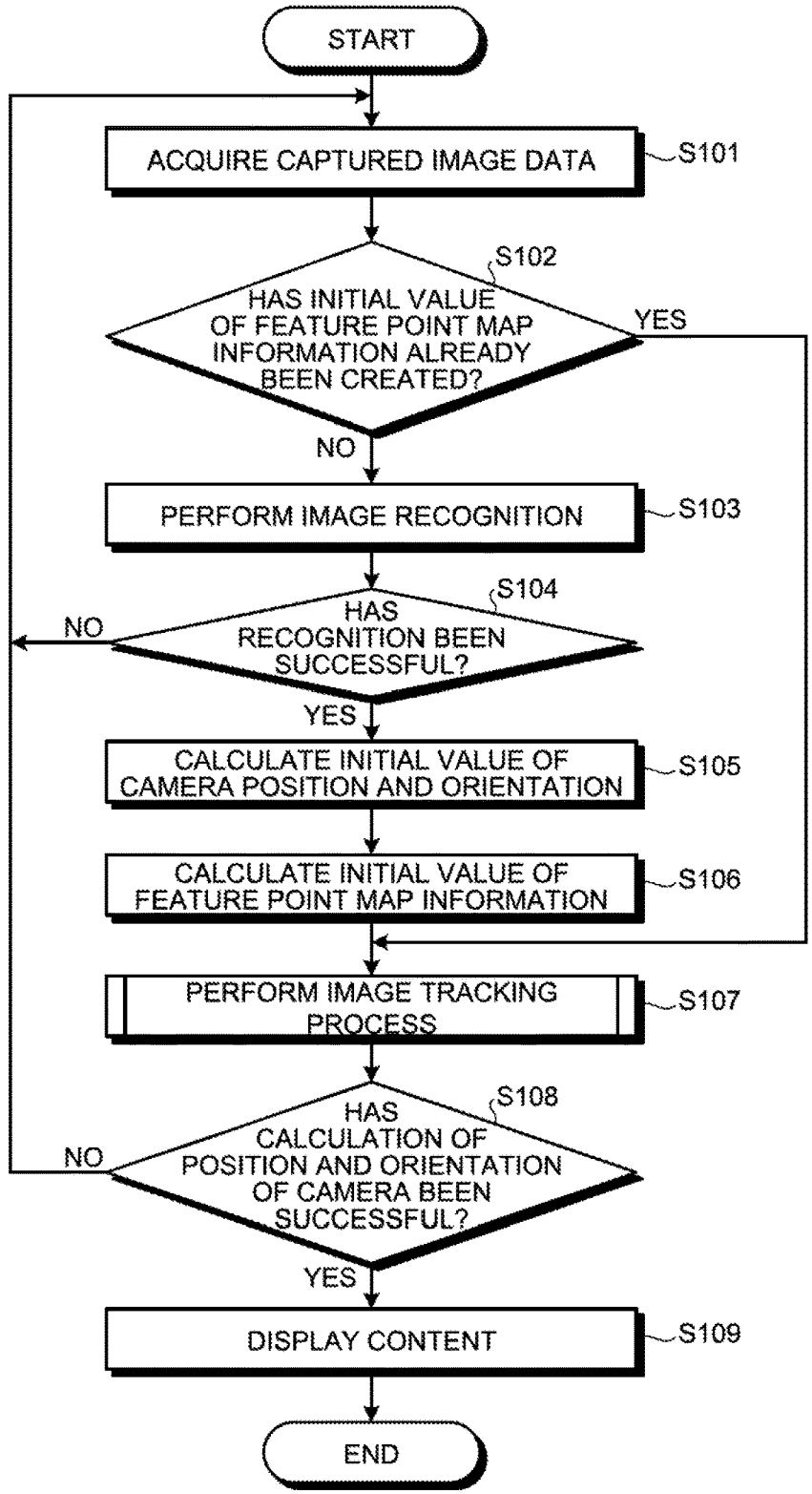
FIG. 7 is a flowchart illustrating the flow of a process performed by the image processing device according to the embodiment.

In the following, the flow of a process performed by the image processing device 100 according to the embodiment will be described. FIG. 7 is a flowchart illustrating the flow of a process performed by the image processing device according to the embodiment. The image processing device 100 repeatedly performs the process illustrated in FIG. 7 every time the image processing device 100 acquires new captured image data.

As illustrated in FIG. 7, the acquiring unit 151 in the image processing device 100 acquires the captured image data (Step S101). If the image processing device 100 has already created the initial value of the feature point map information 143 (Yes at Step S102), the image processing device 100 proceeds to Step S107. If the image processing device 100 has not yet created the initial value of the feature point map information 143 (No at Step S102), the image processing device 100 proceeds to Step S103.

The image recognition unit 153 in the image processing device 100 performs image recognition based on both the captured image data and the recognition purpose image data (Step S103). If the recognition has not been successful (No at Step S104), the image recognition unit 153 proceeds to Step S101. If the recognition has been successful (Yes at Step S104), the image recognition unit 153 proceeds to Step S105.

The position-and-orientation estimating unit 155 in the image processing device 100 calculates the initial value of the position and the orientation of the camera 50 (Step S105). The map information creating unit 154 in the image processing device 100 calculates the initial value of the feature point map information 143 (Step S106). The map information creating unit 154 and the position-and-orientation estimating unit 155 perform the image tracking process (Step S107).

If the position-and-orientation estimating unit 155 has not succeeded in calculating the position and the orientation of the camera 50 (No at Step S108), the position-and-orientation estimating unit 155 proceeds to Step S101. If the position-and-orientation estimating unit 155 has succeeded in calculating the position-and-orientation of the camera 50 (Yes at Step S108), the position-and-orientation estimating unit 155 proceeds to Step S109. The content creating unit 156 in the image processing device 100 displays the content (Step S109).

Figure 8:
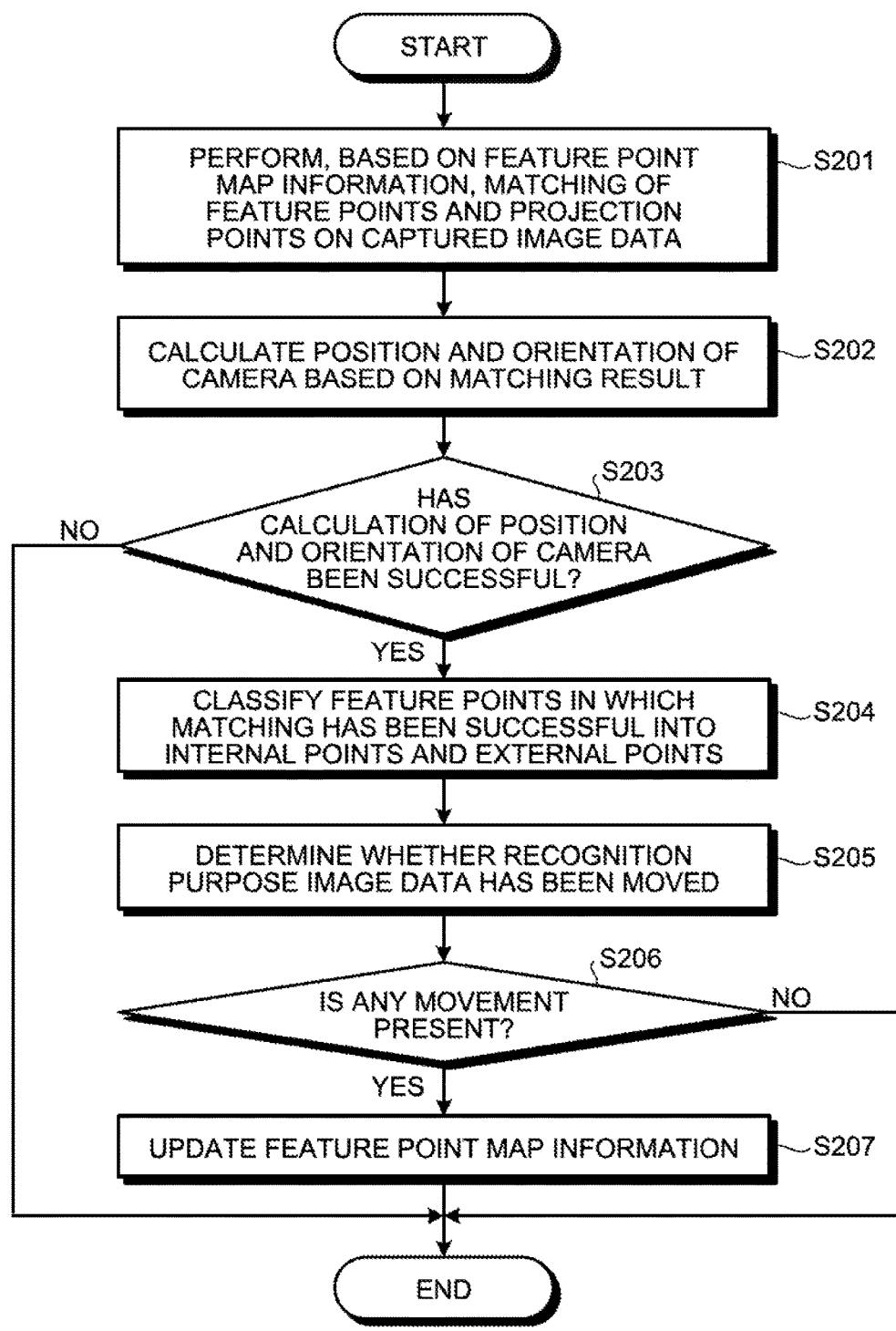
FIG. 8 is a flowchart illustrating the flow of an image tracking process.

In the following, the flow of the image tracking process indicated at Step S107 illustrated in FIG. 7 will be described. FIG. 8 is a flowchart illustrating the flow of the image tracking process. As illustrated in FIG. 8, the position-and-orientation estimating unit 155 in the image processing device 100 performs, based on the feature point map information 143, the matching of the feature points and the projection points on the captured image data (Step S201).

The position-and-orientation estimating unit 155 calculates the position and the orientation of the camera 50 based on the result of the matching (Step S202). If the position-and-orientation estimating unit 155 has not succeeded in calculating the position and the orientation of the camera 50 (No at Step S203), the position-and-orientation estimating unit 155 ends the image tracking process. If the position-and-orientation estimating unit 155 has succeeded in calculating the position-and-orientation of the camera 50 (Yes at Step S203), the position-and-orientation estimating unit 155 proceeds to Step S204.

The map information creating unit 154 in the image processing device 100 classifies the feature points in which the matching has been successful into the internal points and the external points (Step S204). The map information creating unit 154 determines whether the recognition purpose image data has been moved (Step S205). If the recognition purpose image data has not been moved (No at Step S206), the map information creating unit 154 ends the image tracking process.

In contrast, if the recognition purpose image data has been moved (Yes at Step S206), the map information creating unit 154 updates the feature point map information 143 (Step S207) and ends the image tracking process.

Figure 9:
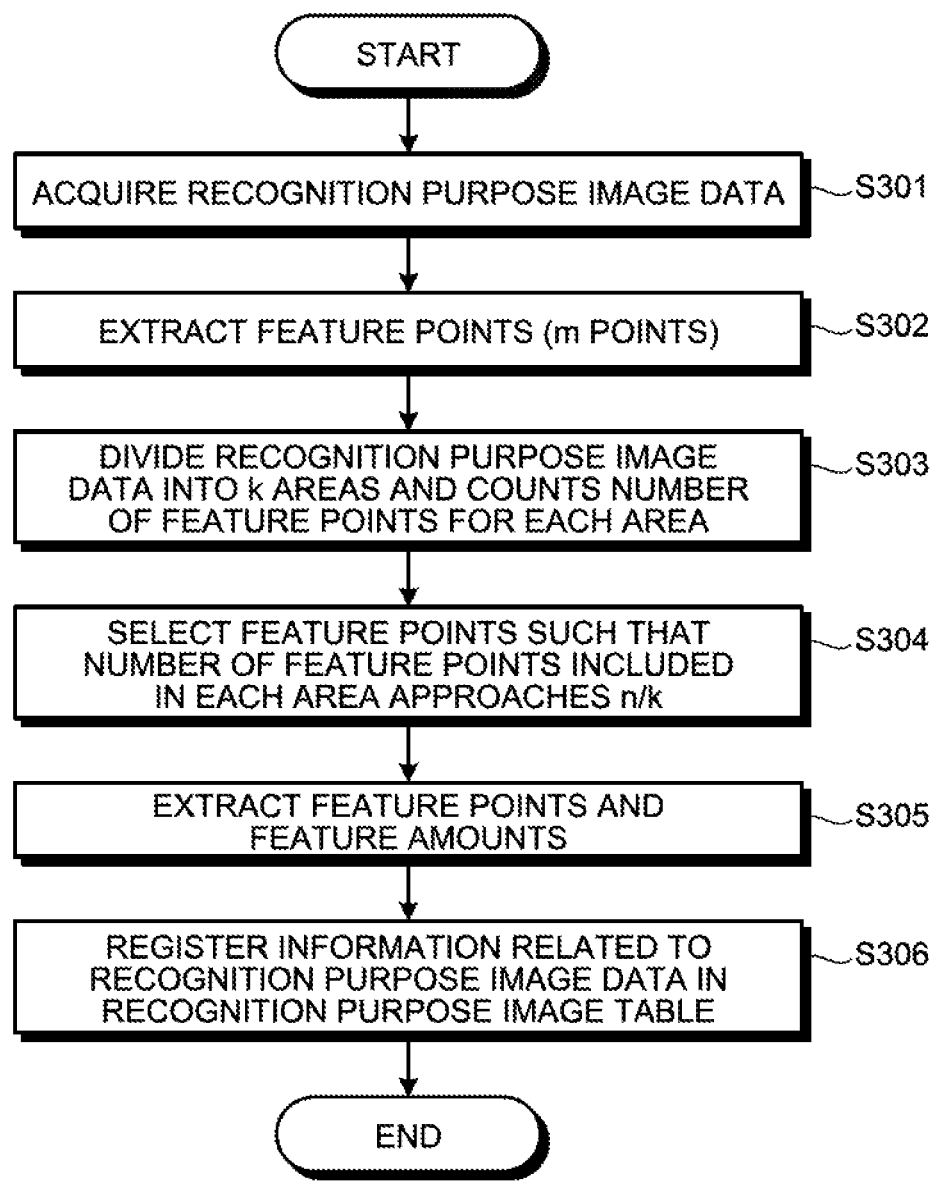
FIG. 9 is a flowchart illustrating the flow of a process performed by the registration unit.

In the following, the flow of the process performed by the registration unit that registers the information on the recognition purpose image data will be described. FIG. 9 is a flowchart illustrating the flow of the process performed by the registration unit. As illustrated in FIG. 9, the registration unit 152 in the image processing device 100 acquires the recognition purpose image data (Step S301). The registration unit 152 extracts m feature points from the recognition purpose image data (Step S302).

The registration unit 152 divides the recognition purpose image data into k areas and counts the number of feature points for each of the areas (Step S303). The registration unit 152 selects the feature points such that the number of the feature points included in each of the areas approaches n/k (Step S304).

The registration unit 152 extracts the feature points and the feature amounts (Step S305). The registration unit 152 registers the information related to the recognition purpose image data in the recognition purpose image table 142 (Step S306).

In the following, the effect of the image processing device 100 according to the embodiment will be described. The image processing device 100 divides the recognition purpose image data into a plurality of areas, selects the feature points such that the number of the feature points included in each of the areas is small, and performs a tracking by using the selected feature points. Consequently, because the feature points on the recognition purpose image data are uniformly distributed, it is possible to continuously and stable perform the tracking by using a recognition purpose image.

The image processing device 100 classifies the feature points into the feature points included in the internal area and the feature points included in the external area and then registers the information on the feature points in the feature point map information 143. For example, when only the internal area is moved, by updating only the internal area by using the feature points in the recognition purpose image, the latest state of the feature point map information 143 can be maintained; therefore, it is possible to reduce the processing load and also improve the accuracy of the tracking.

If the recognition purpose image data included in the captured image data is moved, the image processing device 100 updates the feature point map information 143. Consequently, the image processing device 100 can appropriately perform the tracking in accordance with an environmental change.

The image processing device 100 also divides the external area into a plurality of areas, selects the feature points such that a bias of the number of feature points included in each of the areas is small, and performs the tracking by using the selected feature points. Consequently, because the map points in the feature point map information 143 are uniformly distributed, it is possible to continuously and stably perform the tracking by using the feature point map information 143.

Figure 10:
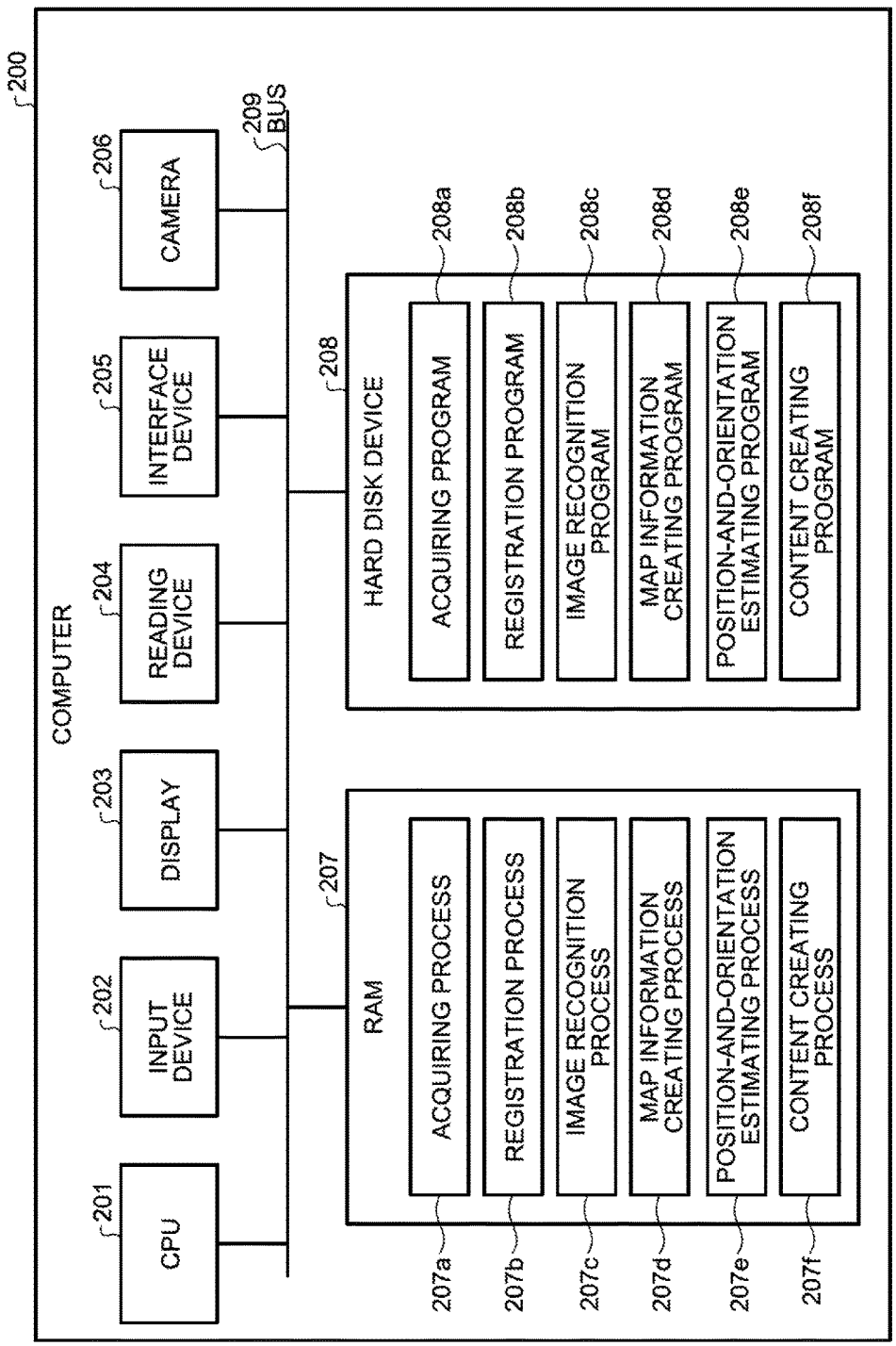
FIG. 10 is a block diagram illustrating an example of the hardware configuration of a computer that implements the same function as that performed by the image processing device.
Figure 11:
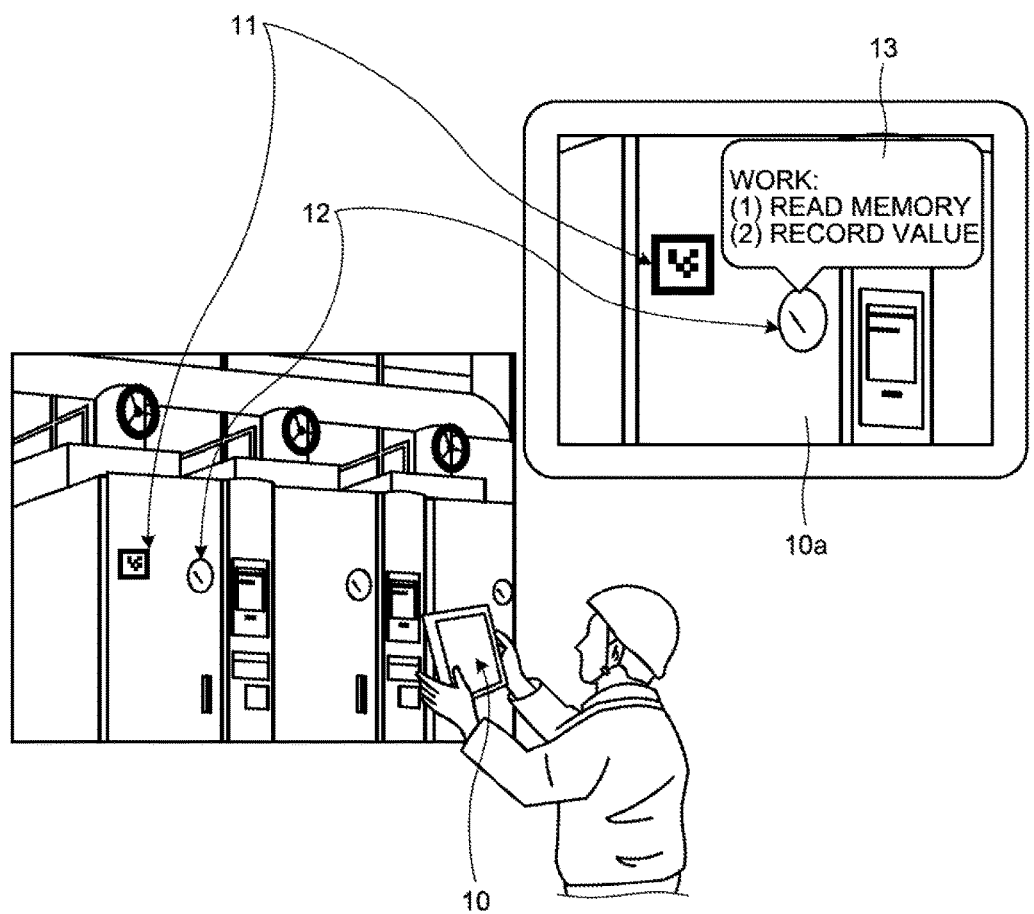
FIG. 11 is a schematic diagram illustrating an example of an AR technology.
Figure 12:
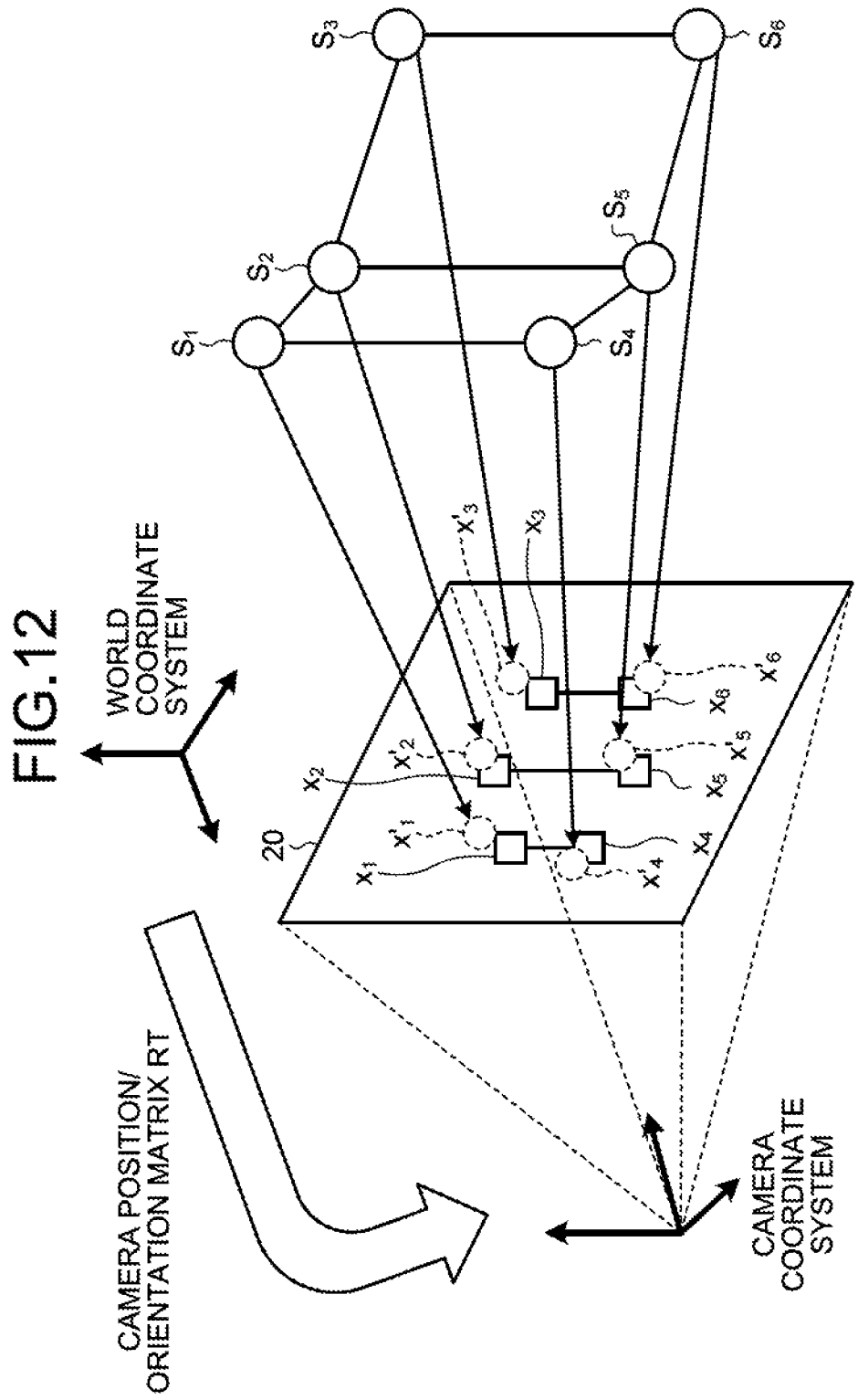
FIG. 12 is a schematic diagram illustrating a conventional technology 1 that obtains the position and the orientation of a camera.
Figure 13:
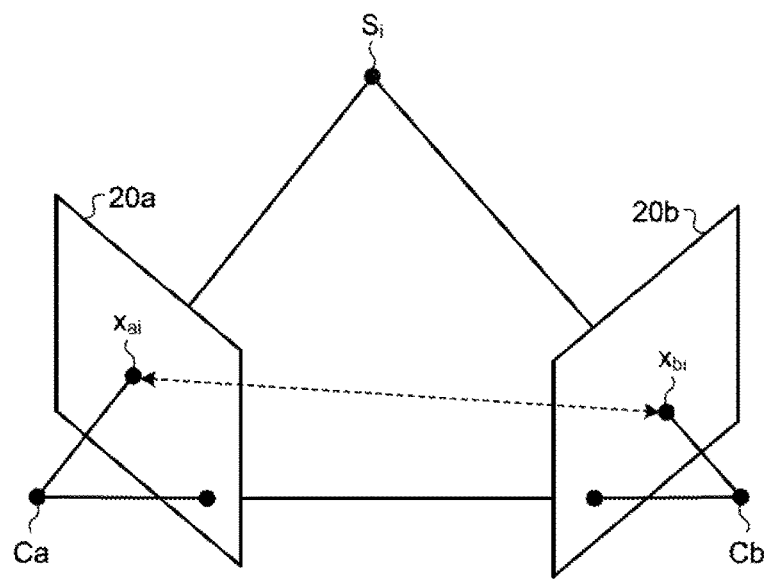
FIG. 13 is a schematic diagram illustrating the conventional technology 1 that creates a three-dimensional map.
Figure 14:
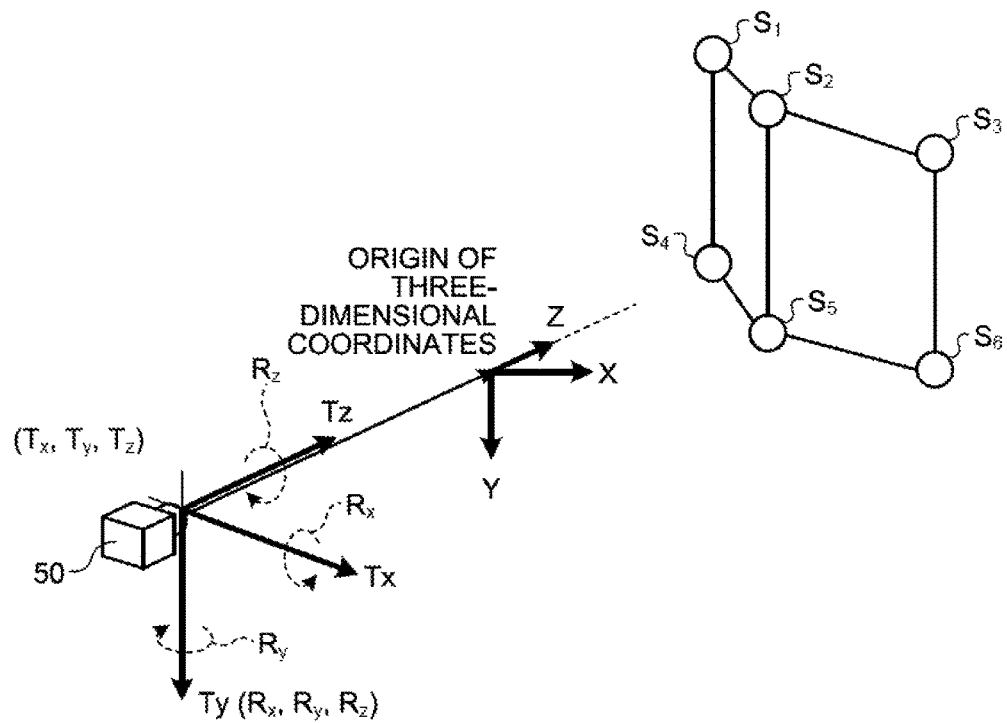
FIG. 14 is a schematic diagram illustrating an example of a definition of the image capturing direction of the camera.

In the following, an example of the hardware configuration of a computer that implements the same function as that performed by the image processing device 100 according to the embodiment described above. FIG. 10 is a block diagram illustrating an example of the hardware configuration of a computer that implements the same function as that performed by the image processing device.

As illustrated in FIG. 10, a computer 200 includes a CPU 201 that executes various kinds of arithmetic processing, an input device 202 that receives an input of data from a user, and a display 203. Furthermore, the computer 200 includes a reading device 204 that reads programs or the like from a storage medium and an interface device 205 that sends and receives data to and from another computer via a network. The computer 200 includes a camera 206. Furthermore, the computer 200 includes a RAM 207 that temporarily stores therein various kinds of information and a hard disk device 208. Then, each of the devices 201 to 208 are connected to a bus 209.

The hard disk device 208 includes an acquiring program 208a, a registration program 208b, an image recognition program 208c, a map information creating program 208d, a position-and-orientation estimating program 208e, and a content creating program 208f. The CPU 201 reads the acquiring program 208a, the registration program 208b, the image recognition program 208c, the map information creating program 208d, the position-and-orientation estimating program 208e, and the content creating program 208f and loads the programs into the RAM 207.

The acquiring program 208a functions as an acquiring process 207a. The registration program 208b functions as a registration process 207*b*. The image recognition program 208*c* functions as an image recognition process 207*c*. The map information creating program 208*d* functions as a map information creating process 207*d*. The position-and-orientation estimating program 208*e* functions as a position-and-orientation estimating process 207*e*. The content creating program 208*f* functions as a content creating process 207*f*.

The process of the acquiring process 207*a* corresponds to the process performed by the acquiring unit 151. The process of the registration process 207*b* corresponds to the process performed by the registration unit 152. The process of the image recognition process 207*c* corresponds to the process performed by the image recognition unit 153. The process of the map information creating process 207*d* corresponds to the process performed by the map information creating unit 154. The process of the position-and-orientation estimating process 207*e* corresponds to the process performed by the position-and-orientation estimating unit 155. The process of the content creating process 207*f* corresponds to the process performed by the content creating unit 156.

Furthermore, each of the programs 208*a* to 208*f* does not need to be stored in the hard disk device 208 in advance from the beginning. For example, each of the programs is stored in a "portable physical medium", such as a flexible disk (FD), a CD-ROM, a DVD disk, a magneto-optic disk, an IC CARD, or the like that is to be inserted into the computer 200. Then the computer 200 may also read and execute each of the programs 208*a* to 208*f* from the portable physical medium.

It is possible to continuously and stably perform a tracking by using a recognition purpose image.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An image processing device comprising:
a memory; and
a processor coupled to the memory, wherein the processor executes a process comprising:
dividing a recognition purpose image into "k" areas;
extracting "m" feature points from the recognition purpose image;
counting the number of feature points included in each of the areas divided at the dividing;
selecting the "n" feature points in each of the areas so that differences between the number of the feature points in each of the individual areas and "n/k" is less than a predetermined threshold;
registering information on the selected feature points in the recognition purpose image in the memory; and
estimating a position and an orientation of the camera based on the recognition purpose image registered in the memory and based on a captured image captured by a camera, wherein
"n" is the number of the feature points selected, and
"m" is the predetermined number satisfying m>n.

2. The image processing device according to claim 1, the process further comprising registering each of the information on the feature points in the recognition purpose image and information on the feature points in an external area that is inside the captured image and that is outside the recognition purpose image in map information when the recognition purpose image included in the captured image is recognized based on the feature points in the captured image and based on the feature points in the recognition purpose image, wherein the estimating estimates the position and the orientation of the camera based on the map information.

3. The image processing device according to claim 2, the process further comprising detecting a change in the position of the recognition purpose image included in the captured image and updating the map information, when the detecting detects the change.

4. The image processing device according to claim 2, the process further comprising dividing the external area into a plurality of areas, selecting the feature points in the external area such that a bias of the number of the feature points included in each of the areas is small, and registering information on the selected feature points in the map information.

5. An image processing method comprising:
dividing a recognition purpose image into "k" areas, using a processor;
extracting "m" feature points from the recognition purpose image, using the processor;
counting the number of feature points included in each of the areas divided at the dividing, using the processor;
selecting the "n" feature points in each of the areas so that differences between the number of the feature points in each of the individual areas and "n/k" is less than a predetermined threshold, using the processor;
registering information on the selected feature points in the recognition purpose image in the memory, using the processor; and
estimating a position and an orientation of the camera based on the recognition purpose image registered in the memory and based on a captured image captured by a camera, using the processor, wherein
"n" is the number of the feature points selected, and
"m" is the predetermined number satisfying m>n.

6. The image processing method according to claim 5, the image processing method further comprising registering each of the information on the feature points in the recognition purpose image and information on the feature points in an external area that is inside the captured image and that is outside the recognition purpose image in map information when the recognition purpose image included in the captured image is recognized based on the feature points in the captured image and based on the feature points in the recognition purpose image, wherein the estimating estimates the position and the orientation of the camera based on the map information.

7. The image processing method according to claim 6, the image processing method further comprising detecting a change in the position of the recognition purpose image included in the captured image and updating the map information, when the detecting detects the change.

8. The image processing method according to claim 6, the image processing method further comprising dividing the external area into a plurality of areas, selecting the feature points in the external area such that a bias of the number of the feature points included in each of the areas is small, and registering information on the selected feature points in the map information.

9. A non-transitory computer-readable recording medium having stored therein an image processing program that causes a computer to execute a process comprising:
- dividing a recognition purpose image into "k" areas;
- extracting "m" feature points from the recognition purpose image;
- counting the number of feature points included in each of the areas divided at the dividing;
- selecting the "n" feature points in each of the areas so that differences between the number of the feature points in each of the individual areas and "n/k" is less than a predetermined threshold;
- registering information on the selected feature points in the recognition purpose image in the memory; and
- estimating a position and an orientation of the camera based on the recognition purpose image registered in the memory and based on a captured image captured by a camera, wherein
- "n" is the number of the feature points selected, and
- "m" is the predetermined number satisfying m>n.

10. The non-transitory computer-readable recording medium according to claim 9, the process further comprising registering each of the information on the feature points in the recognition purpose image and information on the feature points in an external area that is inside the captured image and that is outside the recognition purpose image in map information when the recognition purpose image included in the captured image is recognized based on the feature points in the captured image and based on the feature points in the recognition purpose image, wherein the estimating estimates the position and the orientation of the camera based on the map information.

11. The non-transitory computer-readable recording medium according to claim 10, the process further comprising detecting a change in the position of the recognition purpose image included in the captured image and updating the map information, when the detecting detects the change.

12. The non-transitory computer-readable recording medium according to claim 10, the process further comprising dividing the external area into a plurality of areas, selecting the feature points in the external area such that a bias of the number of the feature points included in each of the areas is small, and registering information on the selected feature points in the map information.

* * * * *